(12) United States Patent
Eguchi et al.

(10) Patent No.: US 9,105,224 B2
(45) Date of Patent: Aug. 11, 2015

(54) STEREOSCOPIC DISPLAY DEVICE

(75) Inventors: Makoto Eguchi, Osaka (JP); Shinya Yamasaki, Osaka (JP); Akira Imai, Osaka (JP); Tomoo Takatani, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 142 days.

(21) Appl. No.: 13/989,380

(22) PCT Filed: Nov. 17, 2011

(86) PCT No.: PCT/JP2011/076568
§ 371 (c)(1),
(2), (4) Date: May 23, 2013

(87) PCT Pub. No.: WO2012/070469
PCT Pub. Date: May 31, 2012

(65) Prior Publication Data
US 2013/0235097 A1    Sep. 12, 2013

(30) Foreign Application Priority Data

Nov. 24, 2010  (JP) ................................ 2010-260852

(51) Int. Cl.
*G02B 26/02*    (2006.01)
*G09G 5/14*    (2006.01)
(Continued)

(52) U.S. Cl.
CPC .............. *G09G 5/14* (2013.01); *G02B 27/2214* (2013.01); *G02B 27/26* (2013.01); *G03B 35/24* (2013.01); *H04N 13/0409* (2013.01); *H04N 13/0422* (2013.01); *G09G 2300/0439* (2013.01)

(58) Field of Classification Search
CPC ................ G09G 3/003; G09G 3/3607; G09G 2300/0439; H04N 13/00
USPC ........................ 345/6, 697; 349/15; 359/232
See application file for complete search history.

(56) References Cited

U.S. PATENT DOCUMENTS 5,640,273 A      6/1997  Hamagishi et al.
6,295,109 B1 *   9/2001  Kubo et al. ................... 349/119
(Continued)

FOREIGN PATENT DOCUMENTS

JP      3-119889 A      5/1991
JP      7-322305 A     12/1995
(Continued)

OTHER PUBLICATIONS

International Search Report corresponding to PCT/JP2011/076568, dated Feb. 14, 2012.

*Primary Examiner* — Kumar Patel
*Assistant Examiner* — Randal Willis
(74) *Attorney, Agent, or Firm* — Lowe Hauptman & Ham, LLP

(57) ABSTRACT

A stereoscopic display device includes: a parallax barrier in which light transmission parts that transmit light and light shielding parts that block light are formed alternately, and a display panel that displays a stereoscopic image. A plurality of pixels for displaying the stereoscopic image are formed on the display panel. Each pixel includes a plurality of color forming subpixels that contribute to the color formation of the stereoscopic image, and a contrasting subpixel that contributes to the contrast of the stereoscopic image. In each pixel, the contrasting subpixel is positioned at both ends of the pixel in a direction in which the light transmission parts and the light shielding parts are arranged alternately. In each pixel that overlaps the light shielding part when the display panel is viewed from front, the contrasting subpixel is positioned at both ends of the light shielding part.

18 Claims, 11 Drawing Sheets

(51) Int. Cl.
*G02B 27/22* (2006.01)
*G03B 35/24* (2006.01)
*H04N 13/04* (2006.01)
*G02B 27/26* (2006.01)

(56) References Cited

U.S. PATENT DOCUMENTS

| | | | |
|---|---|---|---|
| 6,703,989 | B1 | 3/2004 | Harrold et al. |
| 2004/0218245 | A1* | 11/2004 | Kean et al. .................... 359/232 |
| 2005/0001787 | A1* | 1/2005 | Montgomery et al. ........... 345/6 |
| 2005/0052529 | A1 | 3/2005 | Mashitani et al. |
| 2006/0170833 | A1* | 8/2006 | Lin et al. .......................... 349/15 |
| 2008/0231767 | A1* | 9/2008 | Lee .................................. 349/15 |
| 2009/0051638 | A1* | 2/2009 | Horiuchi et al. ................. 345/88 |
| 2011/0128269 | A1* | 6/2011 | Lee et al. ........................ 345/211 |
| 2011/0234582 | A1* | 9/2011 | Daiku et al. .................... 345/419 |

FOREIGN PATENT DOCUMENTS

| | | |
|---|---|---|
| JP | 2001-075049 A | 3/2001 |
| JP | 2004-004822 A | 1/2004 |
| JP | 2004-287440 A | 10/2004 |
| JP | 2005-086506 A | 3/2005 |
| WO | 2007088656 A1 | 8/2007 |

* cited by examiner

1

STEREOSCOPIC DISPLAY DEVICE

RELATED APPLICATIONS

The present application is a National Phase of International Application Number PCT/JP2011/076568, filed Nov. 17, 2011, and claims priority from Japanese Application Number 2010-260852, filed Nov. 24, 2010.

TECHNICAL FIELD

The present invention relates to a stereoscopic display device.

BACKGROUND ART

Conventionally, the parallax barrier method has been known as a method of showing stereoscopic images to an observer, without use of specific glasses. For example, H3 (1991)-119889A (Patent Document 1) discloses a stereoscopic video image display device that realizes a parallax barrier in which apertures that allow light to pass therethrough and light shielding parts that block light are provided in a stripe form, on a switching liquid crystal panel.

In a stereoscopic display device of the parallax barrier type, however, pixels that should be behind the parallax barrier are partially visible in the case where stereoscopic images displayed on a display are viewed from a position deviated from the front of the display in the horizontal direction, or in a state where the display is inclined. As a result, a phenomenon that stereoscopic images displayed on the display screen are seen reddish or bluish (hereinafter this phenomenon is called as a stereoscopic image coloring phenomenon) occurs.

DISCLOSURE OF INVENTION

It is an object of the present invention to provide a stereoscopic display device having a novel structure that is capable of suppressing the stereoscopic image coloring phenomenon.

A stereoscopic display device of the present invention includes: a parallax barrier in which light transmission parts that transmit light and light shielding parts that block light are formed alternately; and a display panel that displays a stereoscopic image. In the stereoscopic display device, a plurality of pixels for displaying the stereoscopic image are formed on the display panel; each pixel includes a plurality of color forming subpixels that contribute to the color formation of the stereoscopic image, and a contrasting subpixel that contributes to the contrast of the stereoscopic image; in each pixel, the contrasting subpixel is positioned at both ends of the pixel in a direction in which the light transmission parts and the light shielding parts are arranged alternately; and in each pixel that overlaps the light shielding part when the display panel is viewed from front, the contrasting subpixel is positioned at both ends of the light shielding part.

With the stereoscopic display device of the present invention, the stereoscopic image coloring phenomenon can be suppressed.

DESCRIPTION OF THE INVENTION

Figure 1:
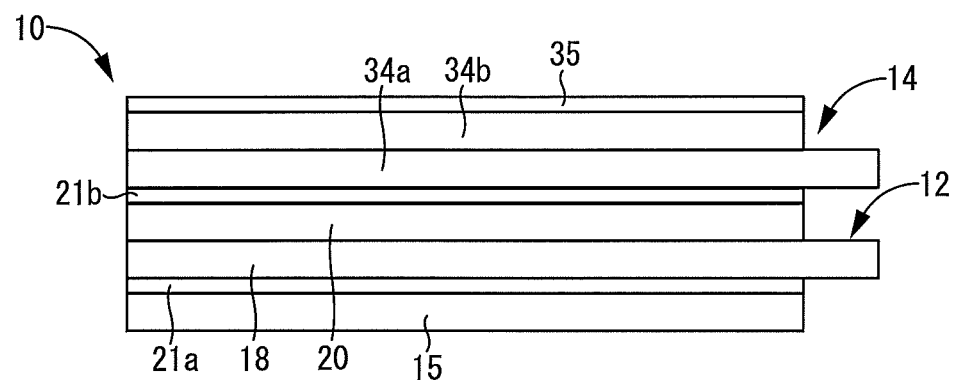
FIG. 1 is a schematic diagram showing a schematic configuration of a stereoscopic display device as Embodiment 1 of the present invention.

A stereoscopic display device according to one embodiment of the present invention includes: a parallax barrier in which light transmission parts that transmit light and light shielding parts that block light are formed alternately; and a display panel that displays a stereoscopic image. In the stereoscopic display device, a plurality of pixels for displaying the stereoscopic image are formed on the display panel; each pixel includes a plurality of color forming subpixels that contribute to the color formation of the stereoscopic image, and a contrasting subpixel that contributes to the contrast of the stereoscopic image; in each pixel, the contrasting subpixel is positioned at both ends of the pixel in a direction in which the light transmission parts and the light shielding parts are arranged alternately; and in each pixel that overlaps the light shielding part when the display panel is viewed from front, the contrasting subpixel is positioned at both ends of the light shielding part (the first configuration).

In the first configuration, when a stereoscopic image displayed on the display panel is viewed, for example, at a position deviated in the horizontal direction from the front of the display panel, or in the state where the display panel is inclined, the pixels that should overlap the light shielding parts when the display panel is viewed from the front are visible. Here, in the first configuration, the contrasting subpixel provided in the pixels concerned are visible. As a result, the phenomenon of coloring a stereoscopic image displayed on the display panel can be suppressed.

The second configuration is the above-described first configuration modified so that in all of the pixels formed on the display panel, the color forming subpixels are arranged in the same manner. In such a configuration, all of the pixels formed on the display panel are seen identical to one another.

The third configuration is the above-described first or second configuration modified so that in all of the pixels formed on the display panel, respective areas of the color forming subpixels are the same as one another. Such a configuration makes the respective manners of color formation of the pixels identical to one another.

The fourth configuration is any one of the above-described first to third configurations that is modified so that the contrasting subpixel is a white subpixel. Such a configuration allows a stereoscopic image to have higher brightness.

The fifth configuration is any one of the above-described first to third configurations that is modified so that the contrasting subpixel is a black subpixel. In such a configuration, brightness irregularities can be prevented. As a result, this makes it possible to improve the display performance.

The six configuration is any one of the above-described first to third configurations that is modified so that in all of the pixels formed on the display panel, the contrasting subpixel positioned at one end of each pixel is a white subpixel, and the contrasting subpixel positioned at the other end of the pixel is a black subpixel.

The seventh configuration is any one of the above-described first to sixth configurations that is modified so that the display panel also displays a two-dimensional image, the pixels are used when the two-dimensional image is displayed, and the contrasting subpixel also contributes to the contrast of the two-dimensional image.

The eighth configuration is any one of the above-described first to seventh configurations that is modified so as to further include a switching liquid crystal panel that is capable of realizing the parallax barrier. Such a configuration allows both of a stereoscopic image (a three-dimensional image) and a plane image (a two-dimensional image) to be displayed.

The ninth configuration is the above-described eighth configuration that is modified so that a width of the light transmission part and a width of the light shielding part are changeable. With such a configuration, not only a binocular stereoscopic display device, but also a multi-view stereoscopic display device can be realized.

The tenth configuration is the above-described eighth or ninth configuration that is modified so that the light transmission parts and the light shielding parts can be replaced with each other. Such a configuration makes it possible to eliminate the phenomenon of pseudoscopic vision in the binocular stereoscopic display device. As a result, the region that provides stereoscopic vision can be enlarged.

The eleventh configuration is any one of the above-described eighth to tenth configurations that is modified so that the direction in which the light transmission parts and the light shielding parts are arranged is changeable. Such a configuration enhances the user-friendliness of the stereoscopic display device.

The twelfth configuration is the above-described eleventh configuration that is modified so that the contrasting subpixel is formed so as to surround the plurality of color forming subpixels. In such a configuration, the phenomenon of coloring a stereoscopic image displayed on the display panel can be suppressed even if the direction in which the light transmission parts and the light shielding parts are arranged is changed.

The thirteenth configuration is the above-described twelfth configuration that is modified so that a plurality of contrasting subpixels are arranged so as to surround the plurality of color forming subpixels.

The fourteenth configuration is any one of the above-described first to thirteenth configurations that is modified so that the display panel is a transmission-type liquid crystal panel. In such a configuration, either one of the parallax barrier and the display panel may be positioned anteriorly (on the observer's side). This makes it possible to increase the degree of freedom in the design of the stereoscopic display device.

The fifteenth configuration is any one of the above-described first to thirteenth configurations that is modified so that the display panel is a semi-transmission-type liquid crystal panel.

The sixteenth configuration is any one of the above-described first to the thirteenth configurations that is modified so that the display panel is a reflection-type liquid crystal panel.

The seventeenth configuration is any one of the above-described fourteenth to sixteenth configurations that is modified so as to further include a backlight that illuminates the display panel from one side in its thickness direction, wherein the parallax barrier is arranged on a side opposite to the backlight with respect to the display panel.

The eighteenth configuration is either the above-described fourteenth or fifteenth configuration that is modified so as to further include a backlight that illuminates the display panel from one side in its thickness direction, wherein the parallax barrier is arranged between the display panel and the backlight.

The nineteenth configuration is any one of the above-described first to thirteenth configurations that is modified so that the display panel is a self-illuminating display panel. It should be noted that as the self-illuminating display panel, for example, an organic ET, (electroluminescence) panel, a plasma display panel (PDP), or the like can be used.

The twentieth configuration is the above-described nineteenth configuration that is modified so that the parallax barrier is arranged on a side of a light emitting face of the self-illuminating display panel.

The twenty-first configuration is the above-described twentieth configuration that is modified so that the parallax barrier is formed in the self-illuminating display panel.

Hereinafter, more specific embodiments of the present invention are explained with reference to the drawings. It should be noted that the drawings referred to hereinafter show, in a simplified manner, only principal members needed for explaining the present invention, among constituent members of embodiments of the present invention, for convenience of explanation. Therefore, a stereoscopic display device according to the present invention may include arbitrary members that are not shown in the drawings that the present specification refers to. Further, the dimensions of the members shown in the drawings do not faithfully reflect actual dimensions of constituent members, dimensional ratios of the constituent members, etc.

Embodiment 1

FIG. 1 shows a stereoscopic display device 10 as Embodiment 1 of the present invention. The stereoscopic display device 10 includes a display panel 12, a switching liquid crystal panel 14, and a backlight 15. In the stereoscopic display device 10, a right-eye image and a left-eye image as stereoscopic images are displayed on the display panel 12. For example, a right-eye image and a left-eye image, each of which is divided in a stripe form, are alternately arranged so as to be displayed. Via a parallax barrier 16 (see FIG. 6) realized in the switching liquid crystal panel 14, the right-eye image and the left-eye image are shown to an observer. This causes only the right-eye image to reach the right eye of the observer, and causes only the left-eye image to reach the left eye of the observer. As a result, the observer is allowed to view a stereoscopic image (a three-dimensional image) without using glasses. Further, a plane image (a two-dimensional image) may be displayed on the display panel 12 in the case where the parallax barrier 16 is not displayed on the switching liquid crystal panel 14, whereby the observer is allowed to view the plane image.

The display panel 12 is a transmission-type liquid crystal panel. It should be noted that the display panel 12 is not limited to a transmission-type liquid crystal panel. For example, a semi-transmission-type liquid crystal panel, a reflection-type liquid crystal panel, an organic EL panel or a PDP as a self-illuminating display panel may be used as the display panel 12. In the case where, for example, a self-illuminating display panel such as an organic ET, panel or a PDP is used as the display panel 12, the backlight 15 is unnecessary.

To briefly explain the display panel 12, the display panel 12 includes a liquid crystal layer that is not shown in the drawings, an active matrix substrate 18 provided on one side in the thickness direction of the liquid crystal layer, and a counter substrate 20 provided on the other side in the thickness direction of the liquid crystal layer. The active matrix substrate 18 has a dimension in the horizontal direction (the left-right direction of FIG. 1) greater than that of the counter substrate 20.

In the active matrix substrate 18 and the counter substrate 20, polarizing plates 21a and 21b are arranged in a bonded state on sides thereof opposite to the liquid crystal layer, respectively. Though not shown, alignment films are provided on the active matrix substrate 18 and the counter substrate 20, respectively.

Figure 2:
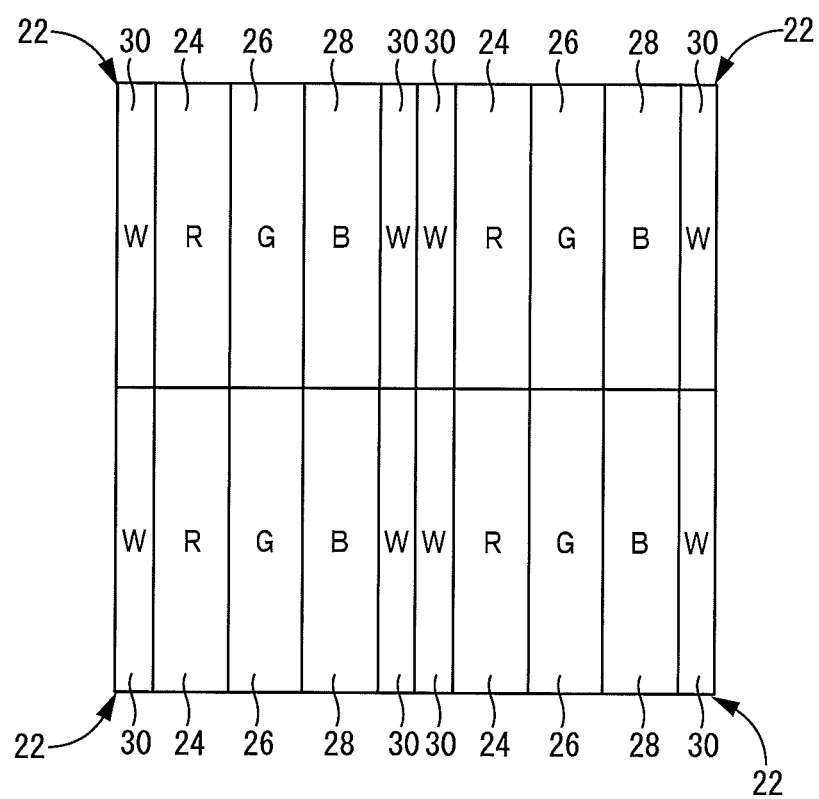
FIG. 2 is a plan view for explaining pixels formed on a display panel provided in the stereoscopic display device shown in FIG. 1.

On the display panel 12, a plurality of pixels 22 are formed in matrix as shown in FIG. 2. Each pixel 22 includes three color forming subpixels (a red subpixel (R) 24), a green subpixel (G) 26, and a blue subpixel (B) 28). The color forming subpixels 24, 26, and 28 contribute to the color formation of stereoscopic images (right-eye images and left-eye images). Each of the color forming subpixels 24, 26, and 28 includes a subpixel electrode (not shown) formed on the active matrix substrate 18, and a colored layer (not shown) provided in a color filter (not shown) formed in the counter substrate 20. The colored layer that the red subpixel 24 has is a colored layer colored in red. The colored layer that the green subpixel 26 has is a colored layer colored in green. The colored layer that the blue subpixel 28 has is a colored layer colored in blue. As the colored layer, for example, a photosensitizing agent (resist) containing a pigment component, or the like, can be used.

The color arrangement of the pixel 22 is a so-called stripe arrangement. In all of the pixels 22, the red subpixel 24, the green subpixel 26, and the blue subpixel 28 are arranged in the same way. In all of the pixels 22, the area of the red subpixel 24, the area of the green subpixel 26, and the area of the blue subpixel 28 are the same as one another.

The pixel 22 includes two white subpixels 30 as contrasting subpixels. The white subpixel 30 contributes to the contrast of stereoscopic images (right-eye images and left-eye images). The white subpixel 30 includes a pixel electrode (not shown) formed on the active matrix substrate 18, and a transmission layer (not shown) provided in a color filter (not shown) formed on the counter substrate 20.

The transmission layer is colorless and transparent. The transmission layer transmits light from the backlight 15 without any change. As the transmission layer, for example, a photosensitizing agent (resist) that does not contain a pigment component, that is, a colorless and transparent photosensitizing agent (resist) that is not colored, or the like, can be used. The white subpixel 30 may be realized by not providing color filters at positions opposed to the pixel electrodes, instead of providing such colorless and transparent transmission layers in the color filter.

In the pixel 22, the two white subpixels 30 are positioned at ends thereof in a direction in which the color forming subpixels (the red subpixel 24, the green subpixel 26, and the blue subpixel 28) are arranged. In other words, in the pixel 22, the color forming subpixels 24, 26, and 28 are positioned between the two white subpixels 30.

In all of the pixels 22, the white subpixels 30 have the same areas. In all of the pixels 22, the area of each white subpixel 30 is half the area of each of the color forming subpixels 24, 26, and 28. This makes it possible to form each white subpixel 30 easily, while obtaining sufficient transmissivity of each of the color forming subpixels 24, 26, and 28. It should be noted that it is not necessary that the area of each white subpixel 30 should be ½ the area of each of the color forming subpixels 24, 26, and 28.

In the normally white mode, the white subpixels 30 can be realized by not applying a driving voltage to the liquid crystal layer. In the normally black mode, the white subpixel 30 can be realized by applying a driving voltage to the liquid crystal layer.

In the display panel 12 as described above, image data corresponding to an image to be displayed are input to the active matrix substrate 18 via lines (not shown) such as FPC (flexible printed circuits). This causes the image to be displayed on the display panel 12. In the case where a stereoscopic image is shown to an observer, a left eye image and a right-eye image are displayed in a state in which pieces of the left-eye image and pieces of the right-eye image are alternately arranged in the display region where a plurality of the pixels 22 are formed. In the case where a plane image is shown to an observer, the plane image is displayed in the display region. In other words, the pixels 22 are used as well when a plane image (a two-dimensional image) is displayed. The white subpixels 30 in each pixel 22 contribute to the contrast of a plane image, as is the case with stereoscopic images (a right-eye image and a left-eye image).

On one side in the thickness direction of the display panel 12, the backlight 15 is provided. As the backlight 15, for example, the following can be used: a direct backlight; an edge light type backlight; and a planar light source type backlight. As a light source for the backlight 15, for example, a cathode ray tube, a light-emitting diode (LED), or the like can be used.

On the other side in the thickness direction of the display panel 12, the switching liquid crystal panel 14 is provided. It should be noted that it is not necessary that the switching liquid crystal panel 14 should be provided on the other side in the thickness direction of the display panel 12, that is, on the side opposite to the backlight 15 with respect to the display panel 12. For example, in the case where the display panel 12 is a transmission-type liquid crystal panel or a semi-transmission-type liquid crystal panel, the switching liquid crystal panel 14 may be arranged between the display panel 12 and the backlight 15. Further, in the case where a self-illuminating display panel such as an organic EL panel or a PDP is used as the display panel 12, the switching liquid crystal panel 14 may be attached to the light-emitting face side of the self-illuminating display panel so that the self-illuminating display panel is provided with the switching liquid crystal panel 14.

Figure 3:
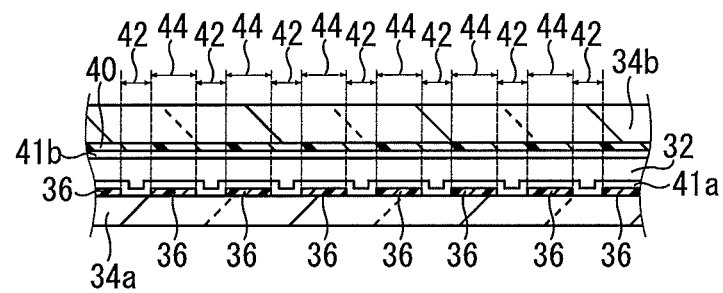
FIG. 3 is a cross-sectional view of a switching liquid crystal panel provided in the stereoscopic display device shown in FIG. 1, taken along, and viewed in the direction indicated by, a line III-III shown in FIG. 4.

The switching liquid crystal panel 14 includes a liquid crystal layer 32, and a pair of substrates 34a and 34b arranged so that the liquid crystal layer 32 is interposed therebetween, as shown in FIG. 3. The operation mode of the liquid crystal is, for example, the twisted nematic mode. As the substrates 34a and 34b, for example, low-alkali glass substrates or the like can be used.

The size and shape of the substrate 34a are approximately identical to those of the active matrix substrate 18. The substrate 34a is bonded to the polarizing plate 21b (see FIG. 1).

The size and shape of the substrate 34b are approximately identical to those of the counter substrate 20. In the substrate 34b, a polarizing plate 35 (see FIG. 1) is bonded on the side opposite to the liquid crystal layer 24.

Figure 4:
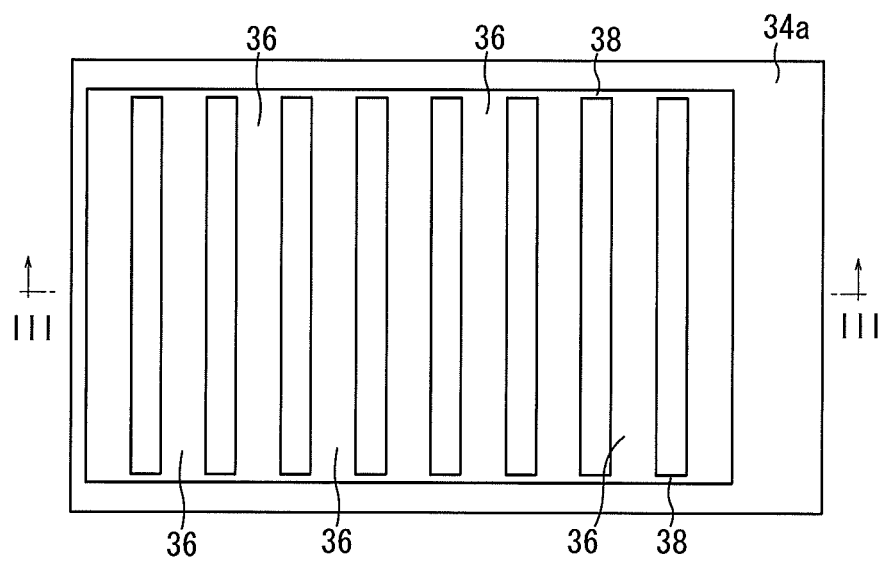
FIG. 4 is a plan view showing electrodes provided on one of the substrates of the switching liquid crystal panel provided in the stereoscopic display device shown in FIG. 1.

In the substrate 34a, a plurality of light shield forming electrodes 36 are formed, as shown in FIGS. 3 and 4. In FIG. 4, only nine light shield forming electrodes 36 are formed, in order to facilitate the understanding, but actually a multiplicity of light shield forming electrodes 36 are formed.

The light shield forming electrodes 36 are formed so as to extend in the vertical direction of the substrate 34a (the vertical direction as viewed in FIG. 4), in an approximately uniform width each. Thus, the light shield forming electrode 36 has a vertically long rectangular shape as a whole.

The plurality of light shield forming electrodes 36 are arranged at constant intervals in the horizontal direction of the substrate 34a (the horizontal direction as viewed in FIG. 4). At both ends in the lengthwise direction of the light shield forming electrodes 36, joint electrodes 38 that extend in the horizontal direction of the substrate 34a in approximately constant widths are formed integrally. Thus, the light shield forming electrodes 36 and the joint electrodes 38 are connected electrically.

As the light shield forming electrodes 36 and the joint electrodes 38, for example, ITO (indium tin oxide) films or the like can be used.

It should be noted that the shape of the light shield forming electrode 36 is not limited to the vertically long rectangle as described above. In other words, the configuration is not limited to such a configuration that one light shielding part 44 (to be described later) is formed with one light shield forming electrode 36.

For example, a plurality of light shield forming electrodes may be formed in matrix on the substrate 34a. In such a configuration, one light shielding part 44 is formed with several light shield forming electrodes.

Further, in such a configuration, the width of a light transmission part 42 to be described later and the width of the light shielding part 44 to be described later can be changed by changing the number of the light shield forming electrodes that form the light shielding part 44. Thus, not only a binocular stereoscopic display device, but also a multi-view stereoscopic display device can be realized.

Further, in such a configuration, the position of the light transmission part 42 to be described later and the position of the light shielding part 44 to be described later can be replaced with each other by changing the light shield forming electrodes that form the light shielding part 44. This makes it possible to eliminate the phenomenon of pseudoscopic vision in the binocular stereoscopic display device. As a result, the region that provides stereoscopic vision can be enlarged.

It should be noted that it is necessary to detect how much the observer's face has moved in the horizontal direction of the display panel 12 (the direction in which the light transmission parts 42 and the light shielding parts 44 to be described later are arranged alternately), in order to eliminate the phenomenon of pseudoscopic vision in the binocular stereoscopic display device. As a method for detecting an amount of movement of the observer's face, for example, the following method can be used: a camera for picking up an image of the observer's face is provided, so that the observer's face an image of which is picked up by the camera is recognized by a face recognition technique and the recognition results are utilized.

Figure 5:
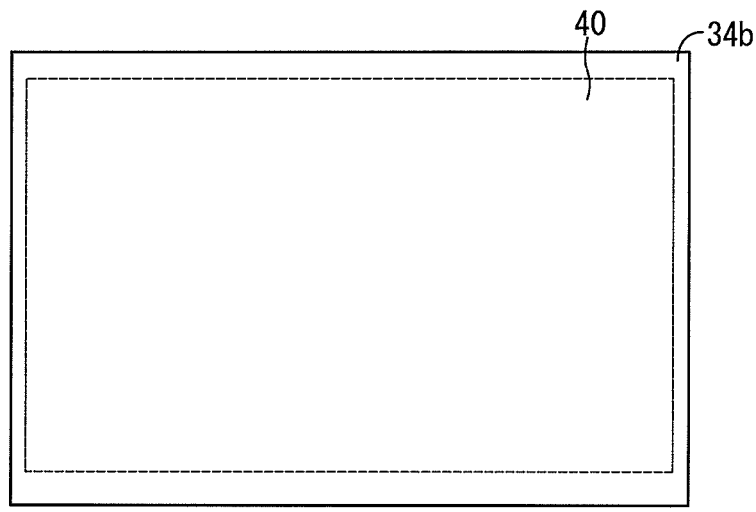
FIG. 5 is a plan view showing electrodes provided on the other one of the substrates of the switching liquid crystal panel provided in the stereoscopic display device shown in FIG. 1.

On the substrate 34b, the counter electrode 40 is formed, as shown in FIGS. 3 and 5. The counter electrode 40 is formed over an entire region of the substrate 34b where the parallax barrier 16 (see FIG. 6) is displayed. As the counter electrode 40, for example, an ITO film or the like can be used.

As shown in FIG. 3, on the liquid crystal layer 32 sides of the substrates 34a and 34b, alignment films 41a and 41b are formed, respectively. As the alignment films 41a and 41b, for example, polyimide resin films or the like can be used.

Figure 6:
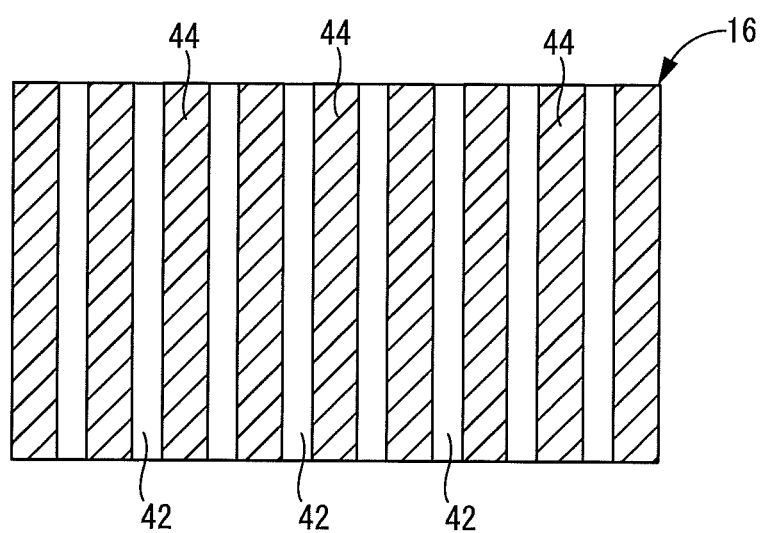
FIG. 6 is a plan view showing a parallax barrier realized by the switching liquid crystal panel provided in the stereoscopic display device shown in FIG. 1.

In the stereoscopic display device 10 as described above, when a driving voltage is applied to the switching liquid crystal panel 14, directions of liquid crystal molecules positioned between the light shield forming electrodes 36 and the counter electrode 40 change. This causes the parallax barrier 16 as shown in FIG. 6 to be displayed on the switching liquid crystal panel 14. The parallax barrier 16 has a configuration obtained by forming the light transmission parts 42, which transmit light therethrough, and the light shielding parts 44, which block light, alternately in the horizontal direction of the switching liquid crystal panel 14.

Figure 7:
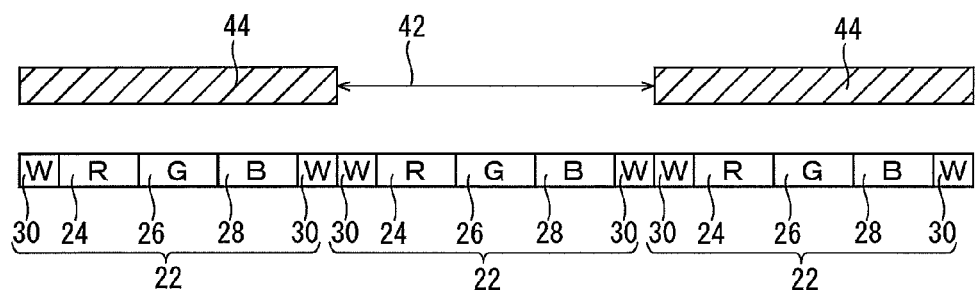
FIG. 7 is a schematic diagram for explaining position relationship between a parallax barrier realized by the switching liquid crystal panel provided in the stereoscopic display device shown in FIG. 1 and the pixels formed on the display panel.

In the state in which the parallax barrier 16 is displayed, there are some pixels 22 that, when projected in the thickness direction of the display panel 12, overlap the light shielding parts 44 of the parallax barrier 16, as shown in FIG. 7. The two white subpixels 30 of each pixel 22 overlapping the light shielding parts 44 are behind the light shielding parts 44, respectively. The two white subpixels 30 are positioned at ends of each pixel 22 in the direction in which the light transmission parts 38 and the light shielding parts 40 are arranged alternately. The two white subpixels 30 provided in the pixel 22 that overlap the light shielding parts 44 as viewed from the front of the display panel 12 are positioned at ends of the light shielding part 40.

It should be noted that the white subpixels 30 provided in the pixel 22 that, when projected in the thickness direction of the display panel 12, overlap the light shielding parts 44 may be visible partially, when the display panel 12 is viewed from the front. Alternatively, with respect to the pixel 22 that, when projected in the thickness direction of the display panel 12, overlaps the light shielding parts 44, the white subpixels 30 provided in the pixels 22 positioned adjacent to the foregoing pixel 22 in the direction in which the light transmission parts 42 and the light shielding parts 44 are arranged may partially overlap the light shielding parts 44 when the display panel 12 is viewed from the front.

Figure 8:
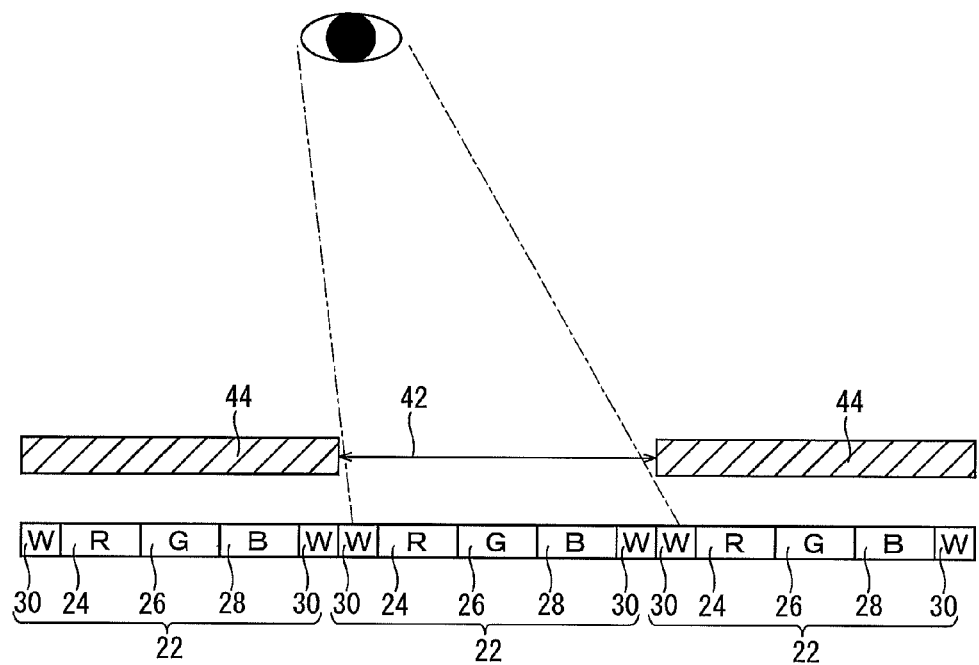
FIG. 8 is a schematic diagram for explaining how the pixels are seen in the case where the display area of the stereoscopic display device shown in FIG. 1 is viewed obliquely.

In the stereoscopic display device 10 as described above, in the case where, for example, stereoscopic images (right-eye images and left-eye images) displayed on the display panel 12 are viewed from a position deviated in the horizontal direction (the direction in which the light transmission parts 42 and the light shielding parts 44 are arranged alternately in the parallax barrier 16) from the front position of the display panel 12, the pixel 22 that is behind the light shielding part 44 when viewed from the front of the display panel 12 is partially visible, that is, the white subpixel 30 provided in the pixel 22 concerned is visible, as shown in FIG. 8. Therefore, this makes it possible to prevent the stereoscopic image coloring phenomenon, which is caused by the phenomenon that the pixels 22 that are behind the light shielding parts 44 and should not be visible are visible.

Further, the stereoscopic display device 10 includes the switching liquid crystal panel 14 displaying the parallax barrier 16. This allows both of plane images and stereoscopic images to be displayed.

Still further, in the stereoscopic display device 10, all of the pixels 22 have the same arrangement of the red subpixel 24, the green subpixel 26, and the blue subpixel 28. This allows all of the pixels 22 to be seen in the same way.

Still further, in the stereoscopic display device 10, the sizes of the red subpixels 24, the green subpixels 26, and the blue subpixels 28 are in the same size in all of the pixels 22. This makes it possible to realize the same color formation in all of the pixels 22.

Application Example 1 of Embodiment 1

Figure 9:
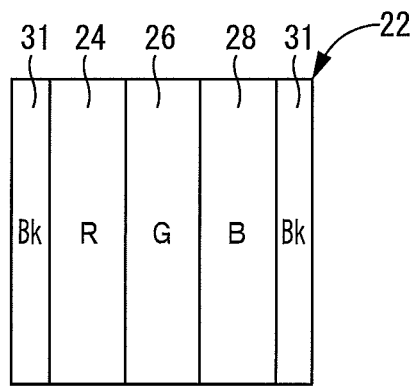
FIG. 9 is a plan view for explaining pixels formed on a display panel provided in a stereoscopic display device as Application Example 1 of Embodiment 1.

As Application Example 1 of Embodiment 1, the configuration may be modified so that black subpixels (Bk) 31 are used as contrasting subpixels in place of the white subpixels 30 in each pixel 22, as shown in FIG. 9.

In the normally black mode, each black subpixel 31 can be realized by not applying a driving voltage to the liquid crystal layer of the display panel 12. In the normally white mode, each black subpixel 31 can be realized by not applying a driving voltage to the liquid crystal layer of the display panel 12.

In such a stereoscopic display device, only the black subpixels 31 are visible. Therefore, brightness irregularities can be prevented, as compared with the case where only the white subpixels 30 are visible. As a result, this makes it possible to improve the display performance.

Application Example 2 of Embodiment 1

Figure 10:
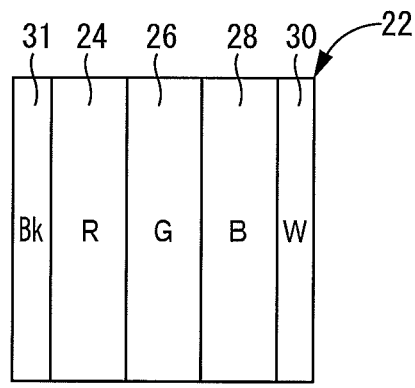
FIG. 10 is a plan view for explaining pixels formed on a display panel provided in a stereoscopic display device as Application Example 2 of Embodiment 1.

As Application Example 2 of Embodiment 1, the configuration may be modified so that one of the two white subpixels 30 in each pixel 22 may be replaced with the black subpixel 31 as a contrasting subpixel, as shown in FIG. 10. It should be noted that the black subpixel 31 is denoted by the same reference numeral as that of Application Example 1 of Embodiment 1, since it is identical to the black subpixel 31 explained in the description of Application Example 1 of Embodiment 1.

Application Example 3 of Embodiment 1

Figure 11:
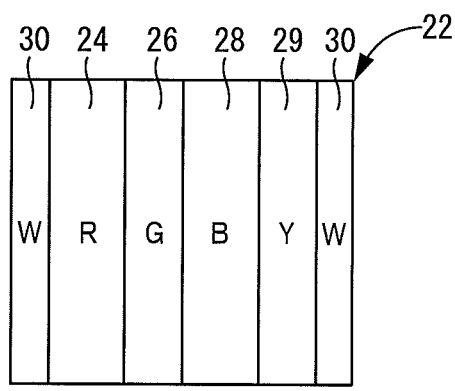
FIG. 11 is a plan view for explaining pixels formed on a display panel provided in a stereoscopic display device as Application Example 3 of Embodiment 1.
Figure 12:
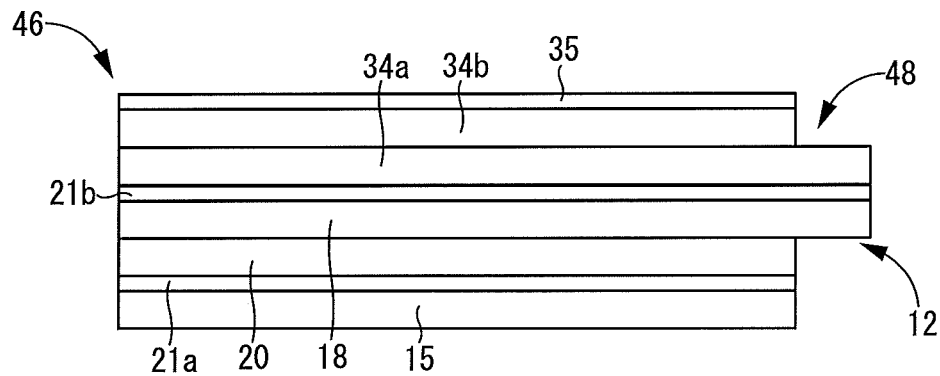
FIG. 12 is a schematic diagram showing a schematic configuration of a stereoscopic display device as Embodiment 2 of the present invention.

As Application Example 3 of Embodiment 1, the configuration may be modified so that in each pixel 22, a yellow subpixel (Y) 29 may be provided as a color forming subpixel, in addition to the red subpixel 24, the green subpixel 26, and the blue subpixel 28, as shown in FIG. 11.

The yellow subpixel 29 includes a pixel electrode (not shown) formed on the active matrix substrate 18, and a colored layer (not shown) provided in a color filter (not shown) formed on the counter substrate 20. The colored layer that the yellow subpixel 29 has is a colored layer colored in yellow. As the colored layer, for example, a photosensitizing agent (resist) containing a pigment component, or the like, can be used.

The areas of the color forming subpixels 24, 26, 28, and 29 are set from the viewpoint of equalizing the brightness of each of colors exhibited by the color forming subpixels 24, 26, 28, and 29. More specifically, the red subpixel 24 and the blue subpixel 28, which are seen darker to the observer's eyes are formed larger than the green subpixel 26 and the yellow subpixel 29, which are seen brighter to the observer's eyes. The red subpixel 24 and the blue subpixel 28 have equal areas. The green subpixel 26 and the yellow subpixel 29 have equal areas.

The yellow subpixel 29 is positioned between the blue subpixel 28 and one of the white subpixels 30. In the other words, the yellow subpixel 29 is positioned at an end of an array of the four color forming subpixels 24, 26, 28, and 29 in the direction in which they are aligned.

Embodiment 2

Next, a stereoscopic display device as Embodiment 2 of the present invention is explained with reference to FIGS. 12 to 20. It should be noted that members and portions having the similar configurations as those in Embodiment 1 are denoted by the same reference numerals as those in Embodiment 1, and detailed descriptions of the same are omitted, in the following explanation.

In a stereoscopic display device 46 of the present embodiment, the active matrix substrate 18 and the counter substrate 20 of the display panel 12 are provided reversely. The polarizing plate 21b have approximately the same size and shape as those of the active matrix substrate 18. This makes it possible to ensure a larger area for bonding the active matrix substrate 18 and the polarizing plate 21b to each other, and a larger area for bonding the polarizing plate 21b and the substrate 34a with each other. As a result, this makes it possible to increase the strength of the stereoscopic display device 46.

Further, as compared with the stereoscopic display device 10 of Embodiment 1, the stereoscopic display device 46 includes a switching liquid crystal panel 48 in place of the switching liquid crystal panel 14.

Figure 15:
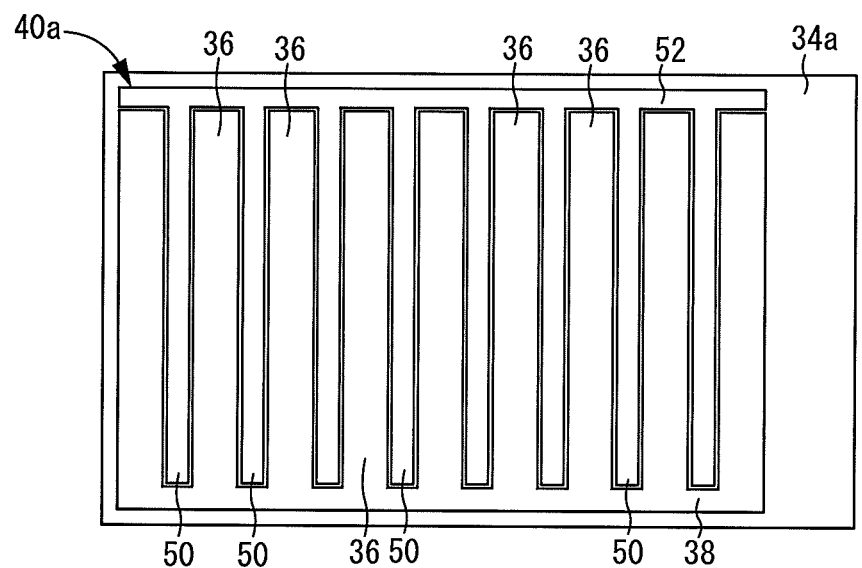
FIG. 15 is a plan view showing electrodes provided on one of the substrates of the switching liquid crystal panel provided in the stereoscopic display device shown in FIG. 12.

As shown in FIG. 15, in the switching liquid crystal panel 48, one end in the lengthwise direction of the light shield forming electrode 36 is formed integrally with the joint electrode 38.

Figure 13:
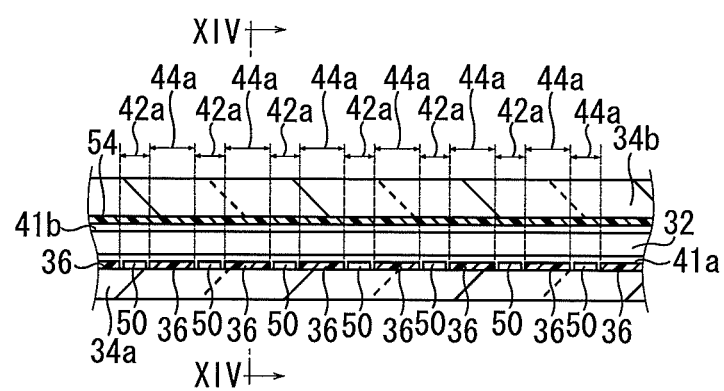
FIG. 13 is a cross-sectional view of a switching liquid crystal panel provided in the stereoscopic display device shown in FIG. 12, taken along, and viewed in the direction indicated by, a line XIII-XIII shown in FIG. 14.

Further, as shown in FIGS. 13 and 15, an auxiliary electrode 50 is formed in each pair of adjacent light shield forming electrodes 36 among the plurality of light shield forming electrodes 36. The auxiliary electrode 50 is formed so as to extend in the vertical direction of the substrate 34*a*, in an approximately constant width. Thus, the auxiliary electrode 50 has a vertically long rectangular shape as a whole.

At the other ends in the lengthwise direction, the plurality of auxiliary electrodes 50 thus arranged are integrally provided with joint electrode 52, respectively, which extends in the horizontal direction of the substrate 34*a* in an approximately constant width. Thus, the auxiliary electrodes 50 and the joint electrode 52 are connected electrically.

As the auxiliary electrodes 50 and the joint electrode 52, for example, ITO films or the like can be used.

Figure 14:
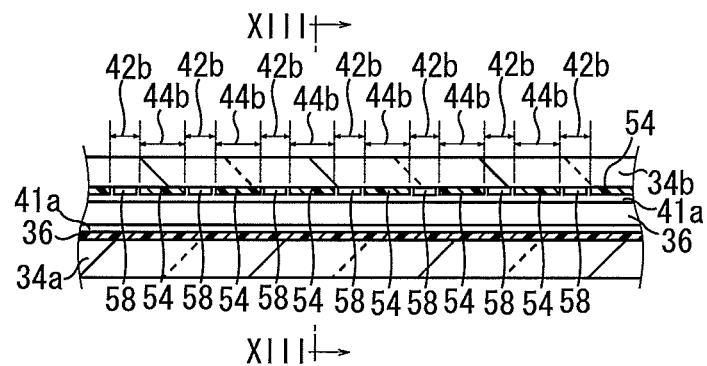
FIG. 14 is a cross-sectional view of a switching liquid crystal panel provided in the stereoscopic display device shown in FIG. 12, taken along, and viewed in the direction indicated by, a line XIV-XIV shown in FIG. 13.
Figure 16:
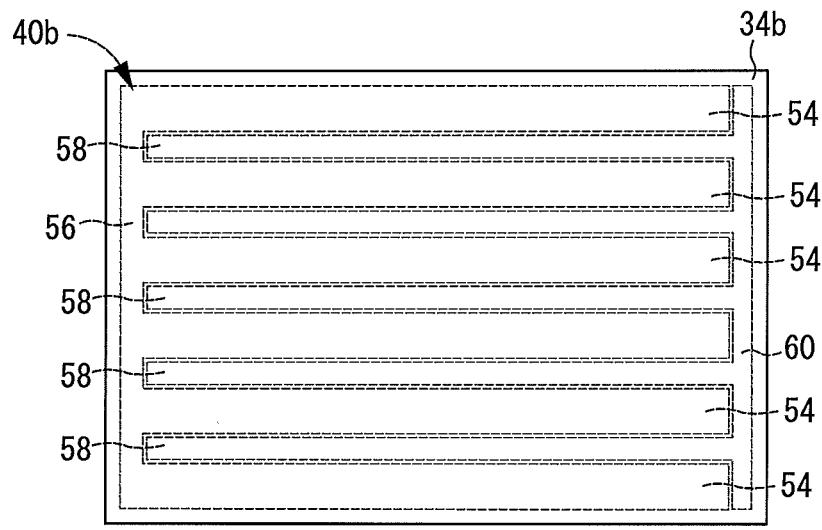
FIG. 16 is a plan view showing electrodes provided on the other one of the substrates of the switching liquid crystal panel provided in the stereoscopic display device shown in FIG. 12.

Further, as shown in FIGS. 14 and 16, a plurality of light shield forming electrodes 54 are formed on the substrate 34*b* as well. The light shield forming electrodes 54 are formed so as to extend in the horizontal direction of the substrate 34*b*, in an approximately constant width each. In other words, the light shield forming electrodes 54 extend in a direction that orthogonally crosses the lengthwise direction of the light shield forming electrodes 36 on the substrate 34*a*. The light shield forming electrode 54 has a horizontally long rectangular shape as a whole.

The plurality of light shield forming electrodes 54 are arranged at constant intervals in the vertical direction of the substrate 34*b*. At ends on one side in the lengthwise direction of the light shield forming electrodes 54, joint electrode 56 which extends in the vertical direction of the substrate 34*b* in an approximately constant width are formed integrally. Thus, the light shield forming electrodes 54 and the joint electrode 56 are connected electrically.

As the light shield forming electrodes 54 and the joint electrode 56, for example, ITO films or the like can be used.

An auxiliary electrode 58 is formed in each pair of adjacent light shield forming electrodes 54 among the plurality of light shield forming electrodes 54. The auxiliary electrode 58 is formed so as to extend in the horizontal direction of the substrate 34*b*, in an approximately constant width. Thus, the auxiliary electrode 58 has a horizontally long rectangular shape as a whole.

At the other ends in the lengthwise direction, the plurality of auxiliary electrodes 58 thus arranged are integrally provided with joint electrode 60, respectively, which extends in the vertical direction of the substrate 34*b* in an approximately constant width. Thus, the auxiliary electrodes 58 and the joint electrode 60 are connected electrically.

As the auxiliary electrodes 58 and the joint electrodes 60, for example, ITO films or the like can be used.

In the stereoscopic display device 46 as described above, two types of parallax barriers 16*a* and 16*b* can be displayed by applying a driving voltage to the switching liquid crystal panel 48.

Figure 17:
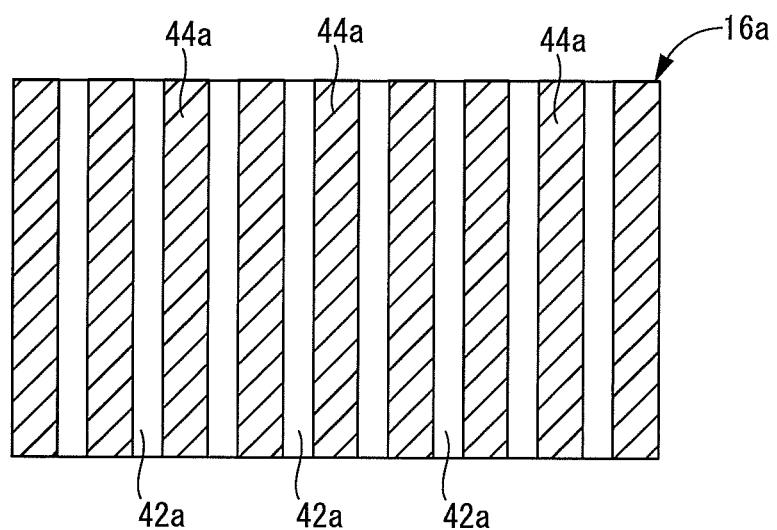
FIG. 17 is a plan view showing a parallax barrier realized by the switching liquid crystal panel provided in the stereoscopic display device shown in FIG. 12.

First, the case where the parallax barrier 16*a* as shown in FIG. 17 is displayed on the switching liquid crystal panel 48 is explained. In the parallax barrier 16*a*, the light transmission parts 42*a* and the light shielding parts 44*a* are formed so as to be arranged alternately in the long side direction of the substrates 34*a* and 34*b* (the horizontal direction as viewed in FIGS. 15 and 16). A driving voltage is applied to the switching liquid crystal panel 48, to cause all of the electrodes on the substrate 38*b* (the plurality of light shield forming electrodes 54 and joint electrode 56, as well as the plurality of auxiliary electrodes 58 and joint electrode 60) and the plurality of auxiliary electrodes 50 and joint electrode 52 provided on the substrate 34*a* to have the same potential (e.g., 0 V), and to cause the plurality of light shield forming electrodes 36 and joint electrode 38 to have a potential (e.g., 5 V) different from that of all of the electrodes provided on the substrate 38*b* (the plurality of light shield forming electrodes 54 and joint electrode 56, as well as the plurality of auxiliary electrodes 58 and joint electrode 60) and the plurality of auxiliary electrodes 50 and joint electrode 52 provided on the substrate 34*a*. Then, the orientation of liquid crystal molecules positioned between the light shield forming electrodes 36 and the counter electrode 40*b* (see FIG. 16) changes. This causes the stripe-form parallax barrier 16*a* as shown in FIG. 17 to be displayed on the switching liquid crystal panel 48. As is clear from the foregoing explanation, in the present embodiment, the plurality of light shield forming electrodes 54 and joint electrode 56, and the plurality of auxiliary electrodes 58 and joint electrode 60 function as a counter electrode 40*b*.

Figure 18:
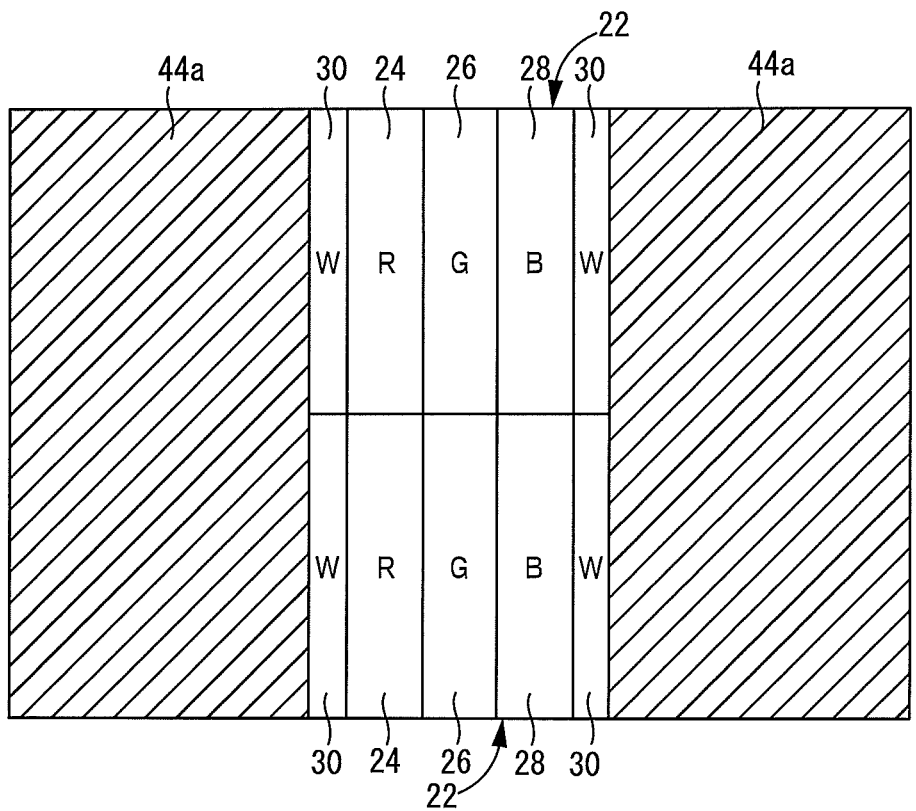
FIG. 18 is a plan view showing relationship between subpixels provided in each pixel and the parallax barrier shown in FIG. 17 in a state in which the parallax barrier is realized.

In the state in which the parallax barrier 16*a* as described above is displayed on the switching liquid crystal panel 48, the color forming subpixels 24, 26, and 28 and white subpixels 30 provided in each pixel 22 are arranged in a direction in which the light transmission parts 42*a* and the light shielding parts 44*a* are arranged alternately, as shown in FIG. 18. As a result, in the case where stereoscopic images (right-eye images and left-eye images) displayed on the display panel 12 are viewed, for example, at a position deviated in the horizontal direction (the direction in which the light transmission parts 42*a* and the light shielding parts 44*a* are arranged alternately in the parallax barrier 16*a*) from the front position of the display panel 12 in a state in which the parallax barrier 16*a* is displayed on the switching liquid crystal panel 48, the pixels 22 that are to be behind the light shielding parts 44*a* when viewed from the front of the display panel 12 are partially visible, that is, the white subpixels 30 provided in the pixels 22 concerned are visible. Therefore, this makes it possible to suppress the stereoscopic image coloring phenomenon, which is caused when the pixels 22, which should be invisible behind the light shielding parts 44*a*, are visible.

Figure 20:
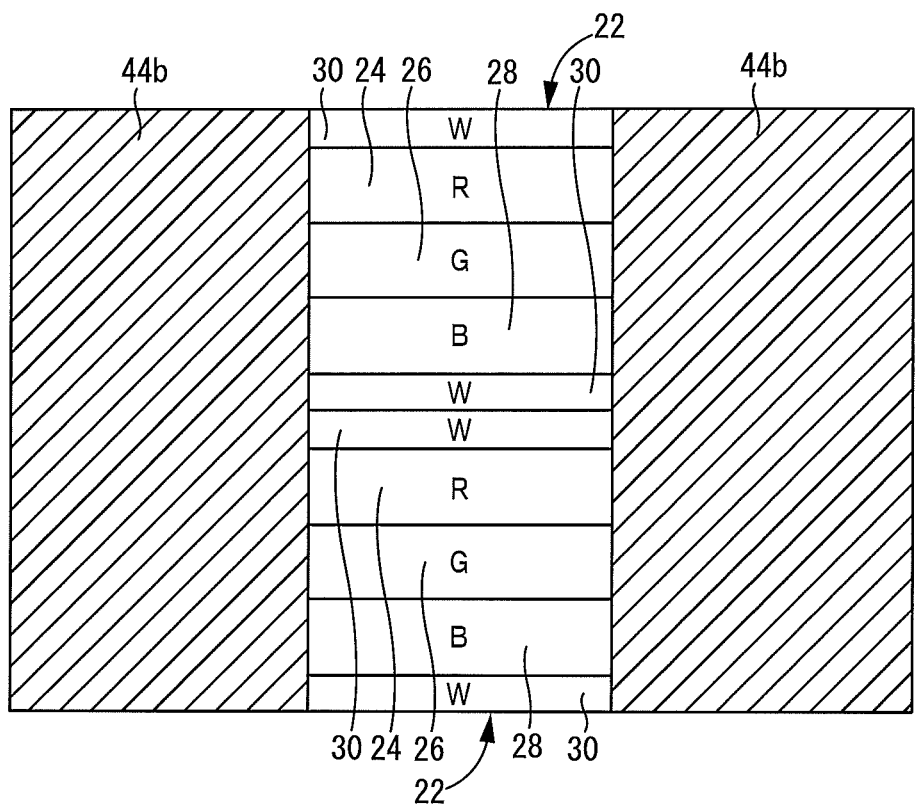
FIG. 20 is a plan view showing relationship between subpixels provided in each pixel and the parallax barrier shown in FIG. 19 in a state in which the parallax barrier is realized.

It should be noted that in the present embodiment, as shown in FIG. 18 and FIG. 20 to be referred to later, each of the plurality of the pixels 22 formed on the display panel 12 has vertical and horizontal dimensions that are equal to each other. In other words, each pixel 22 has a square planar shape.

Figure 19:
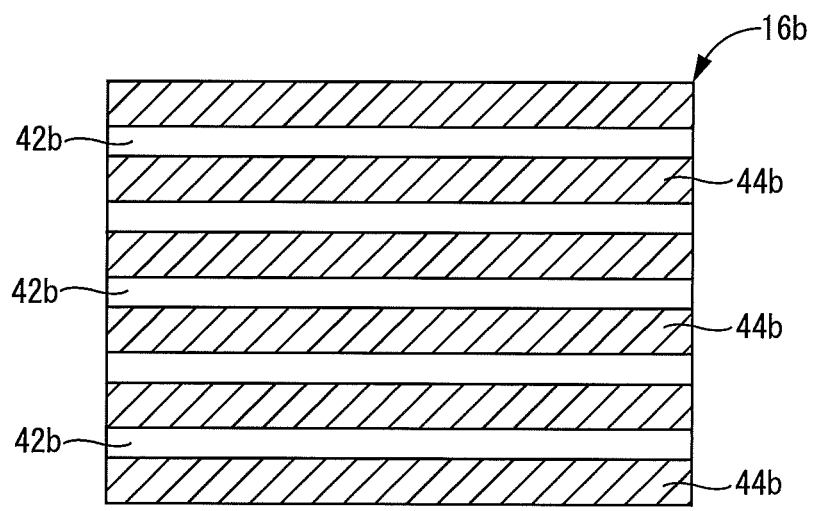
FIG. 19 is a plan view showing another parallax barrier realized by the switching liquid crystal panel provided in the stereoscopic display device shown in FIG. 12.

Next, the case where the parallax barrier 16*b* as shown in FIG. 19 is displayed is explained. In the parallax barrier 16*b*, the light transmission parts 42*b* and the light shielding parts 44*b* are formed so as to be arranged alternately in the short side direction of the substrates 34*a* and 34*b* (the vertical direction as viewed in FIGS. 14 and 15). A driving voltage is applied to the switching liquid crystal panel 48, to cause all of the electrodes on the substrate 34*a* (the plurality of light shield forming electrodes 36 and joint electrode 38, as well as the plurality of auxiliary electrodes 50 and joint electrode 52) and the plurality of auxiliary electrodes 58 and joint electrode 60 provided on the substrate 34*b* to have the same potential (e.g., 0 V), and to cause the plurality of light shield forming electrodes 54 and joint electrode 56 on the substrate 34*b* to have a potential (e.g., 5 V) different from that of all of the electrodes on the substrate 34*b* (the plurality of light shield forming electrodes 36 and joint electrode 38, as well as the plurality of auxiliary electrodes 50 and joint electrode 52) and the plurality of auxiliary electrodes 58 and joint electrode 60 provided on the substrate 34b. Then, the orientation of liquid crystal molecules positioned between the light shield forming electrodes 54 and the counter electrode 40a (see FIG. 15) changes. This causes the stripe-form parallax barrier 16b as shown in FIG. 19 to be displayed on the switching liquid crystal panel 48. As is clear from the foregoing explanation, in the present embodiment, the plurality of light shield forming electrodes 36 and joint electrodes 38, and the plurality of auxiliary electrodes 50 and joint electrodes 52 function as a counter electrode 40a.

In the state in which the parallax barrier 16b as described above is displayed on the switching liquid crystal panel 48, the color forming subpixels 24, 26, and 28 and the white subpixels 30 provided in each pixel 22 are arranged in a direction in which the light transmission parts 42b and the light shielding parts 44b extend, as shown in FIG. 20. As a result, in the case where stereoscopic images (right-eye images and left-eye images) displayed on the display panel 12 are viewed, for example, at a position deviated in the horizontal direction (the direction in which the light transmission parts 42b and the light shielding parts 44b are arranged alternately in the parallax barrier 16b) from the front position of the display panel 12, the pixels 22 that are to be behind the light shielding parts 44a when viewed from the front of the display panel 12, are partially visible, that is, all of the subpixels (the color forming subpixels 24, 26, and 28, as well as the white subpixels 30) provided in the pixels 22 concerned are partially visible. In this case, since the subpixels 24, 26, 28, and 30 are visible at the same rate, colors exhibited by the subpixels 24, 26, 28, and 30 are synthesized and are seen white as a whole, to the observer's eyes. As a result, this makes it possible to suppress the stereoscopic image coloring phenomenon, which is caused when the pixels 22, which should be invisible behind the light shielding parts 44a, are visible.

Further, the stereoscopic display device 46 makes it possible to show stereoscopic images to the observer in both of the case where the long side direction of the substrates 34a and 34b is the vertical direction, and the case where the short side direction of the substrates 34a and 34b is the vertical direction.

Further, in the stereoscopic display device 46, each pixel 22 has vertical and horizontal dimensions that are equal to each other. This allows the slit widths of the parallax barriers 16a and 16b (the width dimensions of the light transmission parts 42a and 42b) to be equal to each other in both of the case where the long side direction of the substrates 34a and 34b is the vertical direction, and the case where the short side direction of the substrates 34a and 34b is the vertical direction. As a result, in both of the case where the long side direction of the substrates 34a and 34b is the vertical direction, and the case where the short side direction of the substrates 34a and 34b is the vertical direction, it is unnecessary to change the distance between the observer and the stereoscopic display device 46 when stereoscopic images (right-eye images and left-eye images) displayed on the display panel 12 are viewed.

Application Example 1 of Embodiment 21

Figure 21:
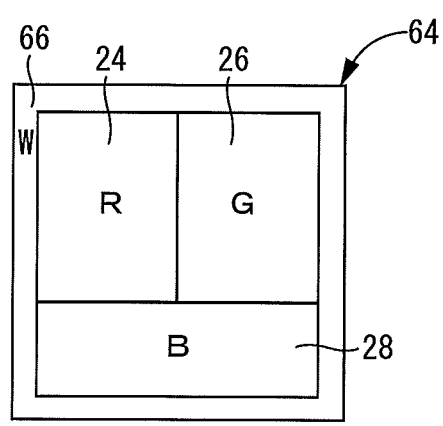
FIG. 21 is a plan view for explaining pixels formed in a display panel provided in a stereoscopic display device as Application Example 1 of Embodiment 2.

As Application Example 1 of Embodiment 2, the configuration may be modified so that pixels 64 as shown in FIG. 21 may be used in place of the pixels 22. Each pixel 64 has a different arrangement of the red subpixel 24, the green subpixel 26, and the blue subpixel 28, as compared with the pixel 22. In the present Application Example 1, the blue subpixel 28 is formed so as to extend in the direction in which the red subpixel 24 and the green subpixel 26 are arranged.

The pixel 64 includes a white subpixel (W) 66 in place of the white subpixels 30, as compared with the pixel 22. The white subpixel 66 has a frame-like shape. The white subpixel 66 is formed so as to surround the red subpixel 24, the green subpixel 26, and the blue subpixel 28. In other words, the red subpixel 24, the green subpixel 26, and the blue subpixel 28 are positioned inside the frame-shaped white subpixel 66.

The area of the white subpixel 66, the area of the red subpixel 24, the area of the green subpixel 26, and the area of the blue subpixel 28 are identical to one another. This makes it possible to easily form the white subpixel 66, while obtaining sufficient transmissivity of the color forming subpixels 24, 26, and 28. It should be noted that it is not necessary that the area of the white subpixel 66 should be identical to the area of each of the color forming subpixels 24, 26, and 28.

In the stereoscopic display device as described above, only the white subpixels 66 are visible in any of the state where the parallax barrier 16a is displayed on the switching liquid crystal panel 48, and the state in which the parallax barrier 16b is displayed on the switching liquid crystal panel 48. As a result, it is less likely that the stereoscopic image coloring phenomenon would occur, as compared with the case where light emitted by the subpixels 24, 26, 28, and 30 is synthesized whereby white color is exhibited as a whole, as is the case with Embodiment 2.

Application Example 2 of Embodiment 2

Figure 22:
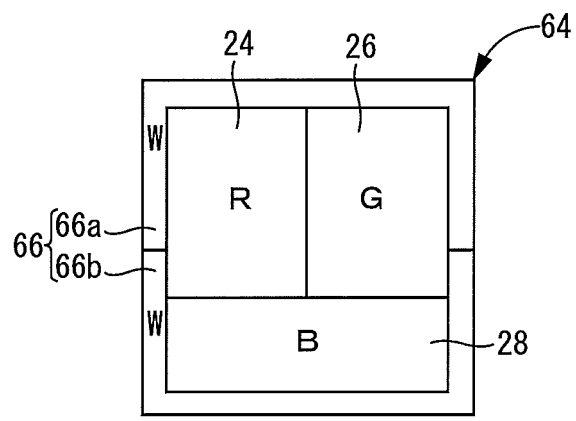
FIG. 22 is a plan view for explaining pixels formed in a display panel provided in a stereoscopic display device as Application Example 2 of Embodiment 2.

It should be noted that the white subpixel 66 is not necessarily realized by a single piece of the white subpixel. For example, as Application Example 2 of Embodiment 2, the configuration may be modified so that a plurality of white subpixels 66a and 66b cooperate to form one frame-shaped white subpixel 66, as shown in FIG. 22. In this case, each of the white subpixels 66a and 66b is formed in a shape that extends in directions for surrounding the plurality of color forming subpixels 24, 26, and 28 in appropriate lengths. FIG. 22 shows a configuration in which two white subpixels 66a and 66b are combined so as to form one white subpixel 66 as a whole, but alternatively the configuration may be such that three or more white subpixels are combined so as to form one white subpixel as a whole. One of the plurality of white subpixels 66a and 66b may be replaced with a black subpixel. It is also possible, of course, to replace all of the plurality of white subpixels with black subpixels.

Application Example 3 of Embodiment 2

Figure 23:
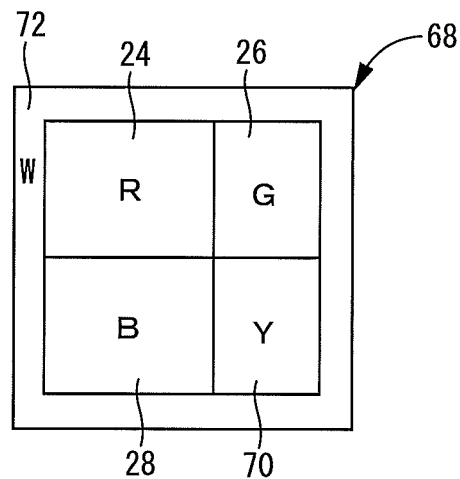
FIG. 23 is a plan view for explaining pixels formed in a display panel provided in a stereoscopic display device as Application Example 3 of Embodiment 2.

As Application Example 3 of Embodiment 2, the configuration may be modified so that pixels 68 as shown in FIG. 23 may be used in place of the pixels 22. The pixel 68 includes a yellow subpixel (Y) 70 as a color forming subpixel, in addition to the red subpixel 24, the green subpixel 26 and the blue subpixel 28, as compared with the pixel 22.

The yellow subpixel 70 includes a pixel electrode (not shown) formed on the active matrix substrate 18, and a colored layer (not shown) provided in a color filter (not shown) formed on the counter substrate 20. The colored layer that the yellow subpixel 70 has is a colored layer colored in yellow. As the colored layer, for example, a photosensitizing agent (resist) containing a pigment component, or the like, can be used.

The areas of the color forming subpixels 24, 26, 28, and 70 are set from the viewpoint of equalizing the brightness of each of colors exhibited by the color forming subpixels 24, 26, 28, and 70. More specifically, the red subpixel 24 and the blue subpixel 28, which are seen darker to the observer's eyes are formed larger than the green subpixel 26 and the yellow subpixel 70, which are seen brighter to the observer's eyes. The red subpixel 24 and the blue subpixel 28 have equal areas. The green subpixel 26 and the yellow subpixel 70 have equal areas.

In the pixel 68, as shown in FIG. 23, the red subpixel 24 is provided at the upper left, the blue subpixel 28 is provided at the lower left, the green subpixel 26 is provided at the upper right, and the yellow subpixel 70 is provided at the lower right. In other words, the red subpixel 24 and the blue subpixel 28, which are seen darker to the observer's eyes, form the left column, and the green subpixel 26 and the yellow subpixel 70, which are seen brighter to the observer's eyes, form the right column. The pixel 68 includes a white subpixel (W) 72 in place of the white subpixels 30, as compared with the pixel 22. The white subpixel 72 has a frame-like shape. The white subpixel 72 is formed so as to surround the four color forming subpixels 24, 26, 28, and 70. In other words, the four color forming subpixels 24, 26, 28, and 70 are positioned inside the frame-shaped white subpixel 72.

So far Embodiments of the present invention have been described in detail, but these are merely examples and do not limit the present invention at all.

For example, in Embodiments 1 and 2 described above, the color arrangement in each pixel may be, for example, the mosaic arrangement or the delta arrangement.

In Embodiments 1 and 2, a PDP (plasma display panel), an organic EL (electroluminescence) panel, an inorganic EL panel, a FED (field emission display) panel, or the like may be used in place of the liquid crystal panel 12.

In a stereoscopic display device according to one embodiment of the present invention, contrasting subpixel may only contribute to the contrast of an image (a stereoscopic image and a two-dimensional image) displayed on the display panel. Examples of the contrasting subpixel that only contributes to the contrast of an image displayed on the display panel (a stereoscopic image and a two-dimensional image) include a white subpixel and a black subpixel.

The invention claimed is:

1. A stereoscopic display device, comprising:
    a parallax barrier in which light transmission parts that transmit light and light shielding parts that block light are formed alternately; and
    a display panel that displays a stereoscopic image, wherein
    a plurality of pixels for displaying the stereoscopic image are formed on the display panel,
    each pixel includes:
        a plurality of color forming subpixels that contribute to color formation of the stereoscopic image; and
        a contrasting subpixel that contributes to contrast of the stereoscopic image,
    in each pixel, the contrasting subpixel is positioned at both ends of the pixel in a direction in which the light transmission parts and the light shielding parts are arranged alternately,
    in each pixel that overlaps the light shielding part when the display panel is viewed from front, the contrasting subpixel is positioned at both ends of the light shielding part,
    the direction in which the light transmission parts and the light shielding parts are arranged is changeable, and
    the contrasting subpixel is formed so as to surround the plurality of color forming subpixels.

2. The stereoscopic display device according to claim 1, wherein in all of the pixels formed on the display panel, the color forming subpixels are arranged in the same manner.

3. The stereoscopic display device according to claim 1, wherein in all of the pixels formed on the display panel, respective areas of the color forming subpixels are the same as one another.

4. The stereoscopic display device according to claim 1, wherein the contrasting subpixel is a white subpixel.

5. The stereoscopic display device according to claim 1, wherein the contrasting subpixel is a black subpixel.

6. The stereoscopic display device according to claim 1,
    wherein the display panel also displays a two-dimensional image,
    the pixels are used when the two-dimensional image is displayed, and
    the contrasting subpixel also contributes to contrast of the two-dimensional image.

7. The stereoscopic display device according to claim 1, further comprising a switching liquid crystal panel that is capable of realizing the parallax barrier.

8. The stereoscopic display device according to claim 7, wherein a width of the light transmission part and a width of the light shielding part are changeable.

9. The stereoscopic display device according to claim 7, wherein the light transmission parts and the light shielding parts can be replaced with each other.

10. The stereoscopic display device according to claim 1, wherein a plurality of contrasting subpixels are arranged so as to surround the plurality of color forming subpixels.

11. The stereoscopic display device according to claim 1, wherein the display panel is a transmission-type liquid crystal panel.

12. The stereoscopic display device according to claim 1, wherein the display panel is a semi-transmission-type liquid crystal panel.

13. The stereoscopic display device according to claim 1, wherein the display panel is a reflection-type liquid crystal panel.

14. The stereoscopic display device according to claim 11, further comprising a backlight that illuminates the display panel from one side in its thickness direction,
    wherein the parallax barrier is arranged on a side opposite to the backlight with respect to the display panel.

15. The stereoscopic display device according to claim 11, further comprising a backlight that illuminates the display panel from one side in its thickness direction,
    wherein the parallax barrier is arranged between the display panel and the backlight.

16. The stereoscopic display device according to claim 1, wherein the display panel is a self-illuminating display panel.

17. The stereoscopic display device according to claim 16, wherein the parallax barrier is arranged on a side of a light emitting face of the self-illuminating display panel.

18. The stereoscopic display device according to claim 17, wherein the parallax barrier is formed in the self-illuminating display panel.

* * * * *